March 9, 1971 E. S. PLASKON 3,568,308

METHOD AND MEANS FOR REFURBISHING AND CUSTOMIZING SERVICE CORD ASSEMBLIES

Filed July 30, 1968

INVENTOR.
EDWARD S. PLASKON
BY
ATTORNEYS

United States Patent Office 3,568,308
Patented Mar. 9, 1971

3,568,308

METHOD AND MEANS FOR REFURBISHING AND CUSTOMIZING SERVICE CORD ASSEMBLIES

Edward S. Plaskon, Clifton, N.J., assignor to Walter A. Plummer, Sherman Oaks, Calif.

Filed July 30, 1968, Ser. No. 748,835
Int. Cl. H01s *4/00*
U.S. Cl. 29—592 10 Claims

ABSTRACT OF THE DISCLOSURE

A method and means for refurbishing, customizing and converting service cord assemblies and the like simply, economically and without need for tools, skilled services or interruption of service. Worn, damaged, discolored or non-harmonizing cord sheaths are quickly refurbished or replaced with a new sheath of selected color harmonizing with the old or some new decorative decor expeditiously and in a highly professional manner. The invention technique and advantages are typified by an appliance such as a telephone set and service cord assembly wherein a standard phone chassis and service cord can be employed selectively with any of a wide range of matching colored cover shells and service cord sheaths.

This invention relates to electrical appliances and equipment and more particularly to a method and means for refurbishing, customizing and converting the service cord and the decorative dress of the appliance simply, economically and without need for tools, skilled services or interruption of the appliance service.

The many advantages and versatility of the invention method and means are applicable to electrical equipment and appliances generally and are typified by way of illustration in a telephone set. The service cords are oftentimes subjected to rough and abusive usage as a result of which the sheath for the cord becomes worn, cut, damaged, or the color becomes faded or disfigured by paint when repainting the surrounding walls. Heretofore, these and other conditions have necessitated replacing the cord with a new one. In a great majority of instances the individual conductors are undamaged and remain as serviceable as before but the unserviceability of the sheath for any of many reasons has necessitated replacement of the entire cord. Both the material and particularly the service vehicle and labor costs for this service operation are excessively high but unavoidable prior to the present invention.

In other cases it is necessary to replace the service cord even though in perfect service condition merely to match the color of the service cord with the cover shell of the phone set proper. The labor cost involved in substituting a service cord of one color with that of a different color has been so high that it has been the practice to carry a full inventory of assembled cord sets and instrument chassis in each of the many colors in demand by the public. In consequence it has been necessary to maintain an inventory many times greater than that heretofore required.

It is, therefore, a primary purpose of the present invention to obviate the foregoing and the many other disadvantages of prior practice. This is accomplished by adoption of a standard appliance chassis and attached service cord provided with a sheath of a selected standard color. A wide selection of differently colored chassis cover shells, colored hand sets and cords, and a matching readily assembled seamed cord sheath for the main service cord are available and readily assembled to the standard set in a color of the customer's choice. If the cord sheath becomes damaged, discolored or disfigured, it is a simple matter to apply a new seamed sheath without need for disconnecting either end of the service cord or interrupting the service of the appliance in any degree. Likewise, if the decorative decor of the surroundings is changed at any time, the color scheme of the phone set may be quickly and inexpensively changed to harmonize therewith while maintaining the phone in operation. Likewise, if either the cover shell or the cord sheath is damaged, only the damaged component need be replaced.

The substitute or refurbishing cord sheath is preferably extruded in one piece from suitable elastomeric material and formed along its lateral edges with interlocking tongues and grooves readily mateable without tools or slider devices. According to one preferred mode of practicing the invention, the sheath strip has a wide selected to encircle the service cord under light hoop tension providing a snug wrinkle-free fit. Alternatively, the strip may be heat shrinkable and, in this event, is assembled in slack condition and then shrunk to a snug fit by the application of moderate heat.

It is, therefore, a primary object of the present invention to provide a novel method and means for refurbishing, customizing an appliance service cord or covering an existing sheath with a new seamed sheath of a color harmonizing with the surrounding environment.

Another object of the invention is the provision of an improved and novel technique for reconditioning service cord assemblies without interrupting the service provided thereby by embracing the cord with a new seamed sheath of a selected color.

Another object of the invention is the provision of a new technique for rejacketing electrical appliances with a cover dress in any selected color which comprises installing a colored instrument cover shell and a matching seamed cord sheath both adapted to be installed without interrupting use of the appliance.

Another object of the invention is the provision of a novel method and means for salvaging a service cord assembly having a damaged or disfigured sheath without need for interrupting the use thereof or disconnecting either end and involving the application of an additional flexible seamed sheath to the exterior of the existing cord assembly.

Another object of the invention is the provision of a means and technique for salvaging and extending the service life of a functionally sound service cord covered by a damaged or unsightly sheath by recovering the damaged sheath with a seamed flexible sheath of heat reactive elastomeric material and heat shrinking the same after assembly into snug wrinkle-free fit with the old sheath.

These and other more specific objects will appear upon reading the following specification and claims and upon considering in connection therewith the attached drawing to which they relate.

Referring now to the drawings in which a preferred embodiment of the invention is illustrated.

Figure 1:
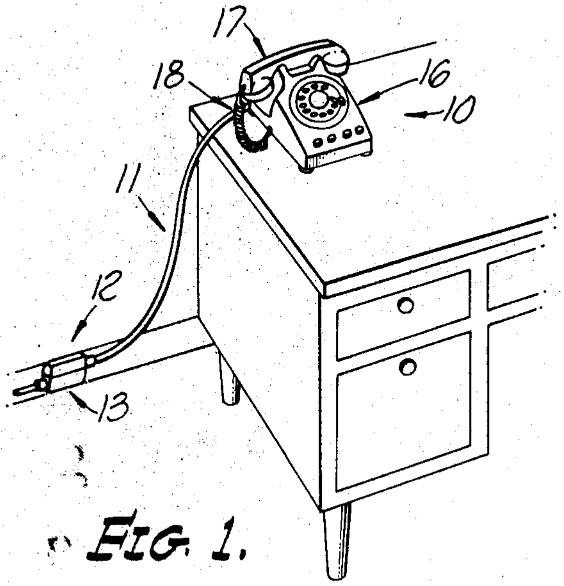
FIG. 1 is a perspective view of an illustrative embodiment of the invention fully assembled.
Figure 2:
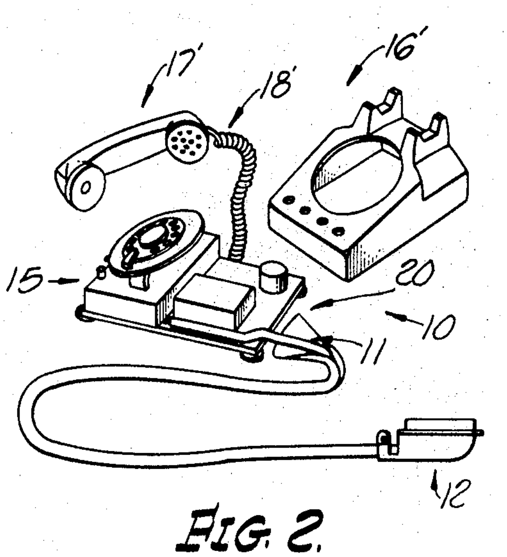
FIG. 2 is a perspective view of the phone set in the process of being refurbished with a new cord sheath and a new cover shell of matching color.

Referring initially more particularly to FIGS. 1 and 2, there is shown, by way of example, a typical appliance comprising a phone set 10 having a service cord 11 provided with a separable coupling half 12 connected with a mating coupling half 13. Phone set 10 includes a conventional chassis 15, a cover shell 16, a hand set 17 and a flexible connector cord 18 extending between the hand set and the chassis.

It will be understood that phone set 10 includes a standard chassis 15 equipped with a standard service cord 11 having the requisite number of conductors for a particular service need. Thus, the number of conductors varies with the number of lines or internal branch lines in circuit with that phone. In general practice, a standard chassis and service cord are finished in black as the chosen standard base color.

At the time of installation or at any subsequent date, the standard chassis and service cord can be converted to any desired color inexpensively and with a minimum of effort. This is accomplished by covering service cord 11 with the invention jacketing 20 and by installing a cover shell 16' of matching color. Additionally a hand set 17' and a connecting cord 18' having a color matching that of color shell 16' are assembled to the standard chassis 15. There is no need for disconnecting the coupling halves 12, 13 or to interrupt the phone service except for the brief interval required to substitute one hand set for another. This operation can be performed in a matter of a few seconds.

Figure 6:
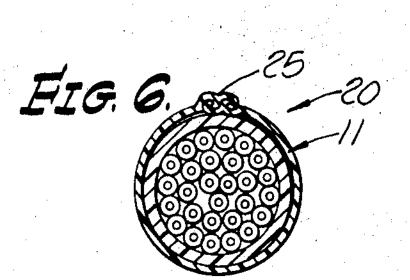
FIG. 6 is a view like FIG. 5 but showing the new sheath shrunk into a snug fit with the cord.
Figure 4:
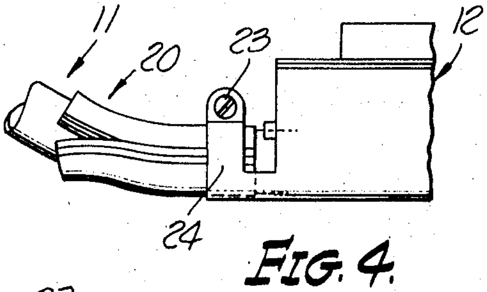
FIG. 4 is an enlarged fragmentary view of the coupling end of the service cord.
Figure 5:
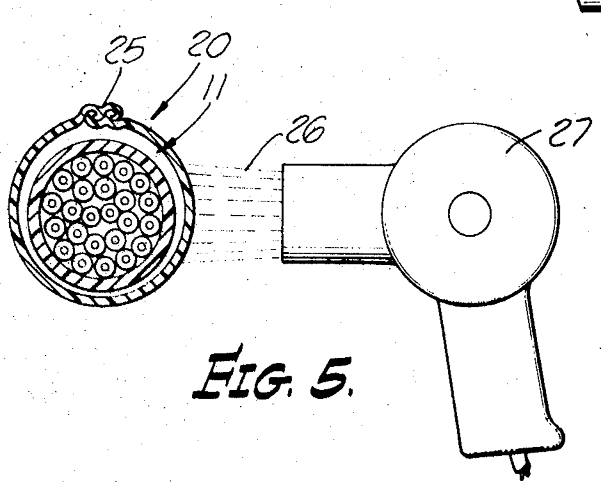
FIG. 5 is a cross-sectional view through the service cord and new sheath while the latter is being shrunk.

The protective cover jacket for the service cord preferably is extruded from thin resilient elastomeric material, such as a suitable thermoplastic composition, as polyvinyl chloride. The opposite lateral edges of the jacket include complementally shaped tongues and grooves shaped to interlock in a separate seam 25 effective to hold the jacket snugly assembled about the service cord. A preferred type of unitary jacket assembly and interlocking seam is shown in United States patent to Walter A. Plummer, No. 3,038,205 granted June 12, 1962, except that the guard flap there shown may be omitted. According to one preferred embodiment jacket 20 is made in a width requiring it to be stretched slightly circumferentially of the service cord in order to interlock the seam. This assures the jacket will fit the service cord tautly and will be free of wrinkles. Additionally the snug fit eliminates the possibility of creep along or twisting of the jacket about the longitudinal axis of the cord. According to a second preferred embodiment, jacket 20 is made of heat reactive or shrinkable elastomeric material. In this case, the assembled girth of the jacket is slightly greater than the girth of the service cord being covered thereby greatly facilitating the assembly operation. Once the seam has been fully closed and arranged to lie straight along one side of the service cord, it is processed to shrink it into a snug fit with the service cord as by directing a stream of heated air 26 thereagainst from a hot air blower 27 in the manner indicated in FIG. 5 until the jacket shrinks tautly and immovably to the service cord sheath. This condition is illustrated in FIG. 6. One end of the assembled jacket terminates beneath clamp 24 as is best shown in FIG. 4, following which the screw 23 is tightened to anchor the jacket firmly in place. The other or chassis end of the jacket is trimmed away in a plane located well inside the chassis perimeter.

A hand set 17' and its connecting cord 18' having a color matching that of jacket 20 is then connected to the chassis terminal blocks following which a cover shell 16' of matching color is inserted over the chassis and clamped in place in the usual manner.

Figure 3:
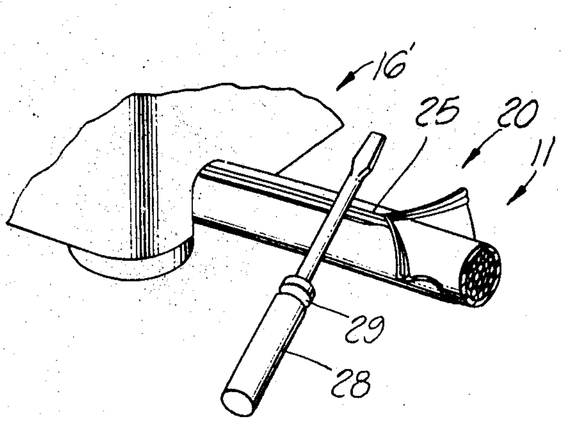
FIG. 3 is a fragmentary view on an enlarged scale showing the sheath seam being closed.

The entire conversion operation is carried out by service personnel having a minimum of training and experience. The only tool needed is an ordinary screwdriver 28 suitable for operating the several screws requiring to be loosened and retightened during the conversion operation. As is best shown in FIG. 3, the shank of the tool or the grooved portion 29 of its handle can be used advantageously to press the overlapped portions of the jacket seam 25 closed. The edges of the seam are held in overlapped position as the tool shank or groove 29 is pressed thereagainst and advanced lengthwise of the seam until all parts are firmly mated.

At a later date if the decorative decor is changed or the service cord becomes damaged, disfigured or in need of replacement for any reason, it is a simple matter to replace the old jacket with a new one of the proper color. The serviceman disassembles the parts in the manner described above and quickly removes the old jacket 20 by opening the seam parts in the customary manner. A new jacket is quickly substituted, as is the cover shell and the hand set. If the color scheme is being changed, a hand set and cover shell of appropriate color are used in the reassembly operation in lieu of the former components. Not infrequently the original service cord cover sheath or the jacket of this invention become damaged, disfigured or unsuitable for further service. In these instances the undamaged core conductors need not be disturbed or replaced and instead the basically sound service cord is refurbished and reconditioned simply by installing a new jacket 20 using either of the jacket assembly techniques referred to above.

While the particular method and means for refurbishing and customizing service cord assemblies herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. That method of refurbishing the service cord of a phone set without need for disconnecting either end of the service cord or interrupting the operation of the phone which method comprises: removing the cover shell of the phone set, encircling one end of a one-piece thin flexible jacket having interlocking tongue-and-groove seam-forming means along its lateral edges about one end of the service cord and progressively closing the seam-forming means along the full length of the service cord, terminating said jacket at a joint adapted to be located within said cover shell when in its assembled position, and assembling a cover shell over the chassis of said phone set.

2. That method defined in claim 1 characterized in the step of selecting a service cord jacket of a color different from the color of the service cord being jacketed and harmonizing with a changed decorating scheme being adopted in the operating environment of the phone set.

3. That method defined in claim 1 characterized in the step of selecting a service cord jacket of slightly resilient elastomeric material having a relaxed assembled girth slightly smaller than the girth of the service cord being enclosed, and stretching said jacket about the service cord while progressively closing the seam therealong to provide a finished service cord assembly having a snug-fitting substantially wrinkle-free jacket simulating a factory made product.

4. That method defined in claim 3 characterized in the step of selecting a cover jacket for the service cord which harmonizes with the changed decor in the immediate operating environment, and replacing the phone set cover shell with a substitute cover shell of a color matching the color selected for the service cord jacket.

5. That method defined in claim 1 characterized in the step of utilizing a service cord cover jacket having a shrinkable main body slightly wider than the girth of the service cord to expedite installation of the jacket about a service cord, and shrinking said jacket into a snug fit with the service cord and effective to minimize any tendency of the jacket to creep lengthwise or circumferentially of the service cord.

6. That method of completing the installation of telephone hand sets in a wide range of decorative colors from a minimum equipment inventory which comprises: maintaining a limited inventory of identical standard phone set chassis with attached service cords of like color, maintaining a supply of cover shells for said chassis in assorted colors, maintaining a supply of service cord jackets in the same assorted colors as said cover shells and each having interlocking seam-forming means extending lengthwise thereof for holding the same snugly assembled about said service cords from end-to-end thereof, adding a service cord jacket and a cover shell of matching selected color to a standard chassis and service cord, said jacket and cover shell being from said limited inventories of each thereof and of a color of a subscriber's choice, and installing the phone set with the added service cord jacket and cover shell at a subscriber's premises.

7. That method of refurbishing an installed phone set while continuing the same in operation thereby to harmonize the phone set with a changed decorative decor in the vicinity of the phone set which method includes the steps of removing the existing cover shell and service cord jacket, installing a new service cord jacket of a selected new color about the phone set service cord without interrupting the serviceability condition thereof, and thereafter securing a new cover shell to the standard chassis and having a color matching the new service cord jacket.

8. That method of refurbishing an installed phone set having a blemished or damaged service cord jacket without interrupting the serviceability thereof by temporarily detaching the chassis cover shell, applying a new service cord jacket of the same type and matching the color of the chassis cover shell, and re-assembling the cover shell to the chassis.

9. That method defined in claim 6 characterized in the steps of selecting a service cord jacket of heat reactive thermoplastic material having an assembled girth slightly greater than the service cord to be covered, subjecting said jacket to mild heating after the same has been assembled to the service cord to shrink the same, and continuing to heat said jacket along the length thereof until said jacket has shrunk into a snug fit with said service cord.

10. That method defined in claim 6 characterized in the steps of utilizing a service cord jacket of heat reactive thermoplastic material having a shrink factor adequate for use with a range of service cord sizes whereby a given jacket can be assembled about and heat shrunk into a snug fit with any size of service cord within the aforementioned range of service cord sizes, assembling a selected jacket color from said supply of heat reactive jackets to said service cord and heat shrinking the jacket until the same has a snug fit with that particular size of service cord.

References Cited

UNITED STATES PATENTS

| | | | |
|---|---|---|---|
| 2,106,048 | 1/1938 | Candy, Jr. | 174—112 |
| 2,120,306 | 6/1938 | Zerader | 174—112 |
| 2,756,172 | 7/1956 | Kidd | 174—ZT |
| 2,960,561 | 11/1960 | Plummer | 174—ZT |
| 3,031,524 | 4/1962 | Hicks | 174—112 |
| 3,102,160 | 8/1963 | Cook et al. | 174—112X |
| 3,334,196 | 8/1967 | Pearlman | 179—179 |

FOREIGN PATENTS

| | | | |
|---|---|---|---|
| 707,767 | 4/1954 | Great Britain | D26—14 |

JOHN F. CAMPBELL, Primary Examiner

R. B. LAZARUS, Assistant Examiner

U.S. Cl. X.R.

D26—14; 174—112